(No Model.)
G. E. MEDLEY & M. W. WILLIAMS.
LATHE.
No. 318,778. Patented May 26, 1885.
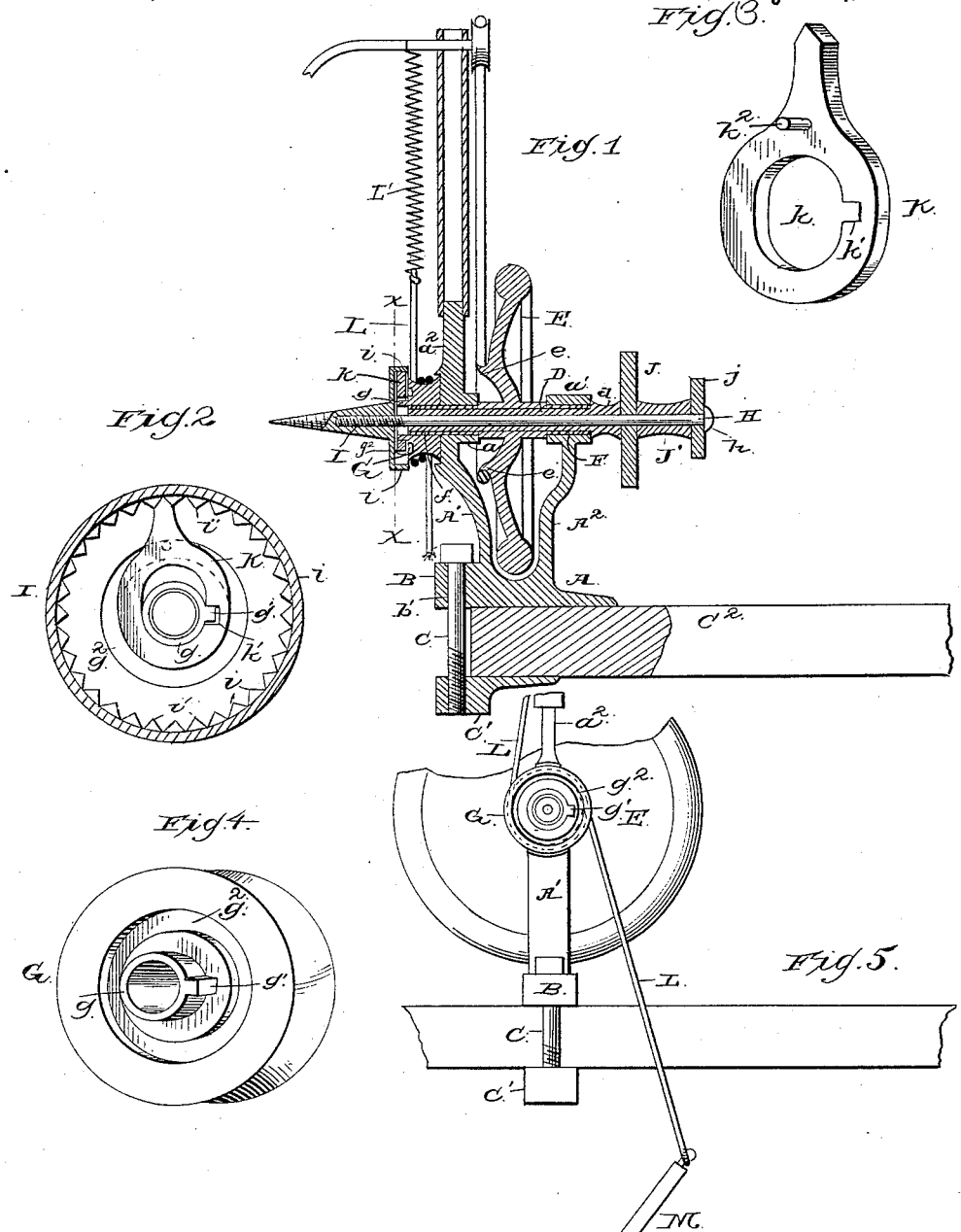

UNITED STATES PATENT OFFICE.

GRANVILLE E. MEDLEY AND MARION WILLIAM WILLIAMS, OF HOPKINSVILLE, KENTUCKY.

LATHE.

SPECIFICATION forming part of Letters Patent No. 318,778, dated May 26, 1885.

Application filed April 7, 1885. (No model.)

*To all whom it may concern:*

Be it known that we, GRANVILLE E. MEDLEY and MARION W. WILLIAMS, citizens of the United States, residing at Hopkinsville, in the county of Christian and State of Kentucky, have invented a new and useful Improvement in Driving and Clutch Mechanism for Lathes, of which the following is a specification, reference being had to the accompanying drawings.

This invention is an improvement in the class of small lathes used by dentists and jewelers, and has for its especial object to provide a light lathe for dentists, which can be conveniently carried from place to place and be clamped in position on any ordinary table or stand.

The invention consists, essentially, in the novel construction of the driving and clutch mechanism, and in other improvements, as will be described.

In the drawings, Figure 1 is a vertical longitudinal section of our lathe clamped to a table. Fig. 2 is a sectional view on line $x\ x$, Fig. 1, illustrating the clutch mechanism. Fig. 3 is a detail perspective view of the clutch-bar, showing its guide-pin. Fig. 4 is a detail perspective view of the drive-pulley, and Fig. 5 is a partial side view of the machine, illustrating the treadle.

The main frame of the machine comprises a base or foot plate, A, on which are mounted two standards, $A'\ A^2$, provided with bearings $a\ a'$. One of these standards, $A'$, may be extended at $a^2$, as shown in Fig. 1, to serve as a support for the dental engine partially shown in Fig. 1. The base A may be provided with screw-holes, so it can be permanently fixed to a bench for laboratory or office use; but it is preferably formed with a lateral lug, B, having a bolt-hole, $b'$, fitted to receive the bolt C, which turns into a lower plate, $C'$, arranged below the table-top $C^2$, and serves to clamp the machine firmly in position.

The hollow shaft D is formed at one end with a shoulder or head, $d$, which engages the side of bearing $a'$, and retains said shaft from movement through such bearing.

A fly-wheel, E, is keyed or otherwise suitably secured on the hollow shaft, between the bearings $a\ a'$, and is provided with a pulley-face, $e$, to receive the band for driving the dental engine. This dental engine may be of the ordinary construction, and requires no detailed description in this application.

A brass or other suitable box, F, is provided in bearing $a'$ for the hollow shaft, and a similar box, $f$, is arranged in bearing $a$. This box $f$ is extended beyond the bearing $a$, and serves to receive the drive-pulley G, presently described.

The inner shaft, H, is inserted through the hollow shaft, and is provided on one end with a head, $h$, and has its other end threaded and turned into a suitable socket in the conical head I.

The rough and fine corundum-wheels J and $j$ are secured in the manner most clearly shown in Fig. 1. The wheel J is clamped by spool $J'$ up against the head of the hollow shaft, and the head of the inner shaft secures the fine corundum-wheel tightly against the outer end of the spool. Thus by removing the inner shaft the corundum-wheels may be removed and others substituted, as may be desired.

The inner end of the head I is formed with a cylindrical flange, $i$, provided internally with a series of notches, $i'$, extending entirely around it. When the inner shaft is screwed up tightly, it will be seen it clamps the head I and the hollow shaft rigidly together, so that the revolution of one will effect the revolution of the other.

The drive-pulley G is provided on the side next the head I with a short hub, $g$, on which is formed or provided a small radial rib or projection, $g'$.

A clutch-bar, K, is provided at one end with a point adapted to engage the notches $i'$, and near its other end with an oval hole, $k$, fitted over the hub $g$ of the drive-pulley, and provided in one of its longest sides with a notch, $k'$, which fits over the rib $g'$ of the hub. The operation of this construction is as follows: When the pulley G is revolved in one direction, the rib $g'$ will raise the clutch-bar K till its point engages the notches $i'$, when the revolving motion of the pulley will be communicated to the head I, and through it to the several connected parts of the device. In the reverse movement of the drive-pulley the rib $g'$ will draw the bar K out of engagement with the notches $i$, and the parts G I will be unclutched.

To operate the drive-pulley it is preferred to use the cord L, connected at one end with a spring, L', by which to retract it, and having its other end wound around the pulley G. This end may be drawn by the hand, but is preferably operated by the foot-treadle mechanism presently described.

To guide the clutch-bar K it is preferably provided with a pin, $k^2$, which enters a radial groove, $g^2$, in the pulley G.

The cord L is connected to the end of extension-bar M, the opposite end of which is pivoted at $m$ to the floor or base. This extension is provided near its pivoted end with a slot, $m'$, in which is pivoted, at $n$, one end of the treadle N. By the described construction it will be seen we gain a long stroke of the extension M with a slight movement of the foot, which is desirable in driving the dental engine, and also in using the lathe, as any considerable movement of the foot is likely to affect the delicacy of touch desired.

By the invention it will be seen there is provided a lathe and dental engine motor the several parts of which can be quickly detached and stored in a small space for convenience to traveling dentists in moving from place to place, and can be quickly erected for use. The clutch mechanism is simple, and the engagements thereof are positive and dispense with all springs and similar expedients.

By interposing the boxing $f$ between the drive-pulley and the hollow shaft such parts are not in contact, and do not by friction impede their revolution in reverse directions, as when the spring retracts the driving-cord and reverses the motion of the drive pulley.

Having thus described our invention, what we claim, and desire to secure by Letters Patent, is—

1. The combination of the head having a cylindrical flange provided with internal notches, the drive-pulley having a projection, $g'$, and the clutch-bar having an opening, $k$, formed with a notch, $k'$, substantially as set forth.

2. The combination of the main frame having bearings $a\ a'$, the hollow shaft supported therein and provided with a shoulder or head, $d$, the head I, the wheels J and $j$, the spool J', and the inner shaft having a head at one end and screw-threaded at its other end into the head I, substantially as set forth.

3. The combination of the head having an internally-notched flange, $i$, the drive-pulley having a hub, $g$, provided with a rib, $g'$, and having a groove, $g^2$, formed in its side next the flange $i$, and the clutch-bar adapted at one end to engage the flange $i$, and provided near its other end with an elongated opening fitted on hub $g$, and having a notch arranged to fit over the rib $g'$, and a pin projected from the clutch-bar into the groove of the drive-pulley, substantially as set forth.

4. The combination of the head I, having a threaded socket and an internally-notched flange, $i$, the hollow shaft, the inner shaft screw-threaded into the head I, the wheels J and $j$, and the spool J', secured by said inner shaft, the drive-pulley G, provided with a hub, $g$, having a rib, $g'$, and having a groove, $g^2$, cut in its face next flange $i$, and the clutch-bar adapted at its outer end to engage the flange $i$, and provided with a pin entering groove $g^2$, and with an elongated opening, $k$, having a notch, $k'$, substantially as set forth.

In testimony that we claim the foregoing as our own we have hereto affixed our signatures in presence of two witnesses.

GRANVILLE E. MEDLEY.
MARION WILLIAM WILLIAMS.

Witnesses:
PALMER GRAVES,
J. E. McPHERSON.